United States Patent
Das (10) Patent No.: US 10,644,953 B2
(45) Date of Patent: May 5, 2020

(54) CLOUD-BASED NETWORK ARCHITECTURE CENTERED AROUND A SOFTWARE-DEFINED SPECTRUM CONTROLLER

(71) Applicant: Federated Wireless, Inc., Arlington, VA (US)

(72) Inventor: Deepak Das, Lexington, MA (US)

(73) Assignee: Federated Wireless, Inc., Arlington, VA (US)

( * ) Notice: Subject to any disclaimer, the term of this patent is extended or adjusted under 35 U.S.C. 154(b) by 86 days.

(21) Appl. No.: 15/881,258

(22) Filed: Jan. 26, 2018

(65) Prior Publication Data

US 2018/0351808 A1 Dec. 6, 2018

Related U.S. Application Data (60) Provisional application No. 62/514,416, filed on Jun. 2, 2017.

(51) Int. Cl.
| | |
|---|---|
| *H04L 12/24* | (2006.01) |
| *H04W 24/02* | (2009.01) |
| *H04L 12/26* | (2006.01) |

(52) U.S. Cl.
CPC .......... *H04L 41/0893* (2013.01); *H04L 41/20* (2013.01); *H04L 41/5019* (2013.01); *H04L 43/08* (2013.01); *H04W 24/02* (2013.01)

(58) Field of Classification Search
CPC ..... H04L 12/24; H04L 43/08; H04L 41/0893; H04L 41/20; H04L 41/5019; H04W 24/02
See application file for complete search history.

(56) References Cited

U.S. PATENT DOCUMENTS

| | | | | |
|---|---|---|---|---|
| 2014/0259012 | A1* | 9/2014 | Nandlall | H04W 8/02 718/1 |
| 2015/0063166 | A1* | 3/2015 | Sif | G06F 9/45533 370/254 |
| 2016/0094395 | A1* | 3/2016 | Hu | H04W 28/16 370/254 |
| 2016/0330602 | A1* | 11/2016 | Das | H04B 7/18523 |
| 2017/0048107 | A1* | 2/2017 | Dosovitsky | H04L 41/0816 |

* cited by examiner

*Primary Examiner* — Kyaw Z Soe
(74) *Attorney, Agent, or Firm* — Finnegan, Henderson, Farabow, Garrett & Dunner, LLP (57) ABSTRACT

The disclosed embodiments provide a software-defined spectrum controller that may be used to dynamically and adaptively change rules and/or policies in a wireless network. The SDSC may dynamically change the rules or policies based on usage of spectrum and/or network resources or any other criterion, e.g., established by a service provider, to allow the service provider to use the spectrum and network resources more efficiently for delivering content and services to customers. In accordance with the disclosed embodiments, the SDSC may use at least one optimization algorithm to determine which policies or rules should be enforced at each of the network nodes in the wireless network. Based on the optimization algorithm, the SDSC may interact with other network nodes to dynamically change one or more of the rules or policies that are enforced in the service provider's network to provide content and services to customers.

34 Claims, 7 Drawing Sheets

BMX: BROADCAST MARKET EXCHANGE
NFV: NETWORK FUNCTION VIRTUALIZATION
SDN: SOFTWARE-DEFINED NETWORKING
OSS: OPERATIONS SUPPORT SYSTEMS
BSS: BUSINESS SUPPORT SYSTEM

CLOUD-BASED NETWORK ARCHITECTURE CENTERED AROUND A SOFTWARE-DEFINED SPECTRUM CONTROLLER

RELATED APPLICATIONS

This application claims the benefit of U.S. Provisional Application No. 62/514,416, filed Jun. 2, 2017, entitled "Cloud-based Network Architecture Centered Around a Software-defined Spectrum Controller," which is hereby incorporated by reference in its entirety.

TECHNICAL FIELD

The disclosed embodiments generally relate to a spectrum controller and, more particularly, to systems and methods for allowing a software-defined spectrum controller to dynamically interact with network nodes to provide network services or resources.

BACKGROUND

The radio frequency (RF) spectrum is the foundation for many wireless communications systems in use today, including radar and cellular communications systems. Specified frequency ranges, sometimes identified as bands or channels, in the RF spectrum may be allocated for use by different entities, for different purposes, or in different geographic locations. As used in this disclosure, "spectrum" generally refers to any frequencies, frequency bands, and frequency channels in the RF spectrum that may be used or allocated for wireless communications.

Many service providers that provide wireless communications systems, including radar and cellular communications systems, use wireless networks to deliver various content and services to customers. A wireless network often employs predetermined spectrum, protocols, and infrastructure to support wireless communications between different network nodes and end users (e.g., customers or subscribers) in the network. As used herein, a network node may be any entity that communicates over the wireless network. Some wireless networks commonly used today include Wi-Fi, broadcast, 3G, and 4G networks. The manner in which different content and services are delivered to customers, and how the wireless networks are used to meet Quality of Service (QoS) criteria associated with such content and services, is often dictated by rules and policies that are hard-coded in one or more network nodes. By way of example, the service provider may implement a policy that prioritizes certain transmissions in the wireless network, e.g., based on the sender, receiver, or content of the transmission, and may further provide one or more rules for implementing the policy, such as, in this example, ensuring the QoS for higher-priority transmissions exceeds a minimum value.

The rules and policies in the wireless network, e.g., hard-coded in firmware, hardware, and/or software in one or more network nodes, are typically set by the service providers to enable enforcement of policies associated with the service providers. In some cellular networks, for example, such rules and policies may be stored in, and enforced by, a policy engine, such as a Policy and Charging Rules Function (PCRF), in conjunction with subscriber information that is captured by a Home Subscriber Server (HSS) in the network. Such existing systems using a PCRF and HSS, however, generally fail to deliver content and services that meet a comprehensive set of criteria established by the service providers.

In addition, because the rules and policies associated with each service provider are typically hard-coded in network nodes in the wireless network, the spectrum used for data transmissions that implement the rules and policies is often pre-assigned by the hard-coded rules or policies and cannot be changed dynamically. There is a need to improve how the service providers can deliver content (e.g., video, audio, web, email, text, and any other types of data) and services using spectrum that may be dynamically allocated without compromising criteria that needs to be met to satisfy their rules and policies.

SUMMARY

The disclosed embodiments overcome the disadvantages of the prior art by providing a software-defined spectrum controller ("SDSC" or "spectrum controller") that may be used to dynamically and adaptively change rules and/or policies in a wireless network. The SDSC may dynamically change the rules or policies based on usage of spectrum and/or network resources or any other criterion, e.g., established by a service provider, to allow the service provider to use the spectrum and network resources more efficiently for delivering content and services to customers. Compared to current PCRF and HSS implementations, for example, the SDSC allows a service provider's rules and policies to be enforced in a more flexible manner.

In some disclosed embodiments, the SDSC may comprise one or more software interfaces for communicating with service-provider functions in the network, such as but not limited to access network functions, signaling and packet core-network functions, network management functions, policy functions, billing functions, service level agreement (SLA) management functions, and content delivery network functions. The SDSC may use these interfaces to receive input from one of more of the service-provider functions and provide guidance to such functions about how to optimize resource usage in the wireless network, such as usage of spectrum resources (e.g., frequency channels or bands) and/or network resources (e.g., infrastructure resources such as available bandwidth). In some disclosed embodiments, the SDSC may be configured to meet one or more criteria, such as business criteria, QoS criteria, etc., and also to satisfy one or more constraints, such as technology constraints, timing constraints, or SLA-based constraints.

In accordance with the disclosed embodiments, the SDSC may use at least one optimization algorithm to determine which policies or rules should be enforced at each of the network nodes in the wireless network, e.g., based on one or more criteria established by the service provider. Inputs to the optimization algorithm may include, for example, the loading, usage, and/or availability of spectrum and network resources in the wireless network, alone or in combination with other inputs. Based on an outcome of the optimization algorithm, the SDSC may interact with other network nodes to dynamically change one or more of the rules or policies that are enforced in the service provider's network to provide content and services to customers.

In some embodiments, the SDSC may be implemented in a cloud-based network architecture, e.g., to reduce the use of physical space and promote cost efficiency for operating the spectrum controller. In such disclosed embodiments, the cloud-based SDSC may provide software-defined control of one or more spectrum and network resources. For example, the SDSC may be implemented as a cloud-based service and may interact with various service-provider functions via standardized interfaces. Such interfaces, where appropriate, may have a cloud-friendly RESTful implementation in some exemplary embodiments. Additionally, or alternatively, such interfaces, where appropriate, may use software-defined networking (SDN) technology, such as OpenFlow, to communicate guidance to the service-provider functions.

In yet further disclosed embodiments, the SDSC may interface with an analytics engine that may provide input to the optimization algorithm of the spectrum controller, such as, for example, one or more inputs relating to business requirements or constraints in the network and/or insights as to spectrum or network resource usage or availability. Such communication from the analytics engine may be over standardized interfaces and, as appropriate, have a cloud-friendly RESTful implementation. In some embodiments, the SDSC may interface with the service-provider's network management functions, such as those in a central data center, and/or with functions residing in a network operations center to provide visibility into decisions being taken by the spectrum controller and its impact on how network resources are being used.

In accordance with certain disclosed embodiments, the SDSC may use "service chaining" capability of those service-provider functions that have SDN capability to support service chaining. For example, the SDSC may be the primary source of intelligence to determine which service-provider functions should be "chained," under which circumstances, in which order, and with which settings. In this manner, the SDSC may dictate how data (e.g., packets) served by the service-provider network may be routed and may also determine a corresponding QoS to provide to such data. The SDSC may base this intelligence on its algorithm (s) designed to optimize one or more criteria using information about the nature of the different spectrum and network resources controlled by the different service-provider functions. In some embodiments, the SDSC may use analytics to fine-tune such algorithms during the course of the service.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The disclosed embodiments provide a wireless network architecture that may be used to provide a cloud-based service in a wireless network. The cloud-based service may implement one or more network and business functions. To that end, the disclosed embodiments may include a spectrum controller that is configured to communicate and interact with one or more network nodes, such as network data centers, in the wireless network using at least one software-defined networking interface. The spectrum controller may provide certain functions for the cloud-based service and also may call on other or related functions for the cloud-based service in one or more of the other network nodes. In some disclosed embodiments, the spectrum controller may be configured to control the cloud-based service using functions in one or more network data centers associated with one or more content or service providers (collectively, "service providers").

In the disclosed embodiments, the wireless network architecture may include network functions that may be partitioned between the cloud service, for example in the spectrum controller, and one or more network data centers. Although they are partitioned, the network functions may interact with each other via the spectrum controller. As used herein, a "function" generally refers to any function or partition of a function, e.g., that may implemented in either the spectrum controller or a network data center. The spectrum controller may interact with the network functions and also may interact with the network data centers. The spectrum controller may perform various roles in the wireless network architecture, including interacting with different entities in the network, such as but not limited to management services, data centers, and content providers and networks that provide data served by the data centers. As used herein, "data" refers to any information that may be transmitted in the network, and "content" refers to the substance of any data transmission or larger data transmission of which it is a part.

In some disclosed embodiments, the spectrum controller function and the network management functions may be parts of a service running in a public cloud service, such as Amazon Web Services. However, the described embodiments of the present disclosure are not limited to public cloud services. Additionally, or alternatively, the spectrum controller function and the management functions may be extended to private cloud platforms as well as other legacy platforms that have the capability to create programmatic interfaces.

The disclosed embodiments provide a software-defined interface that allows a software-defined spectrum controller to interact with other management, control, and data plane entities within the wireless network architecture. For example, the spectrum controller can identify various business and technical needs of a service provider in order to determine which network functions should communicate with the data centers. Some of the business and technical requirements may include, but are not limited to, Federal Communication Commission (FCC) rules, such as Citizens Band Radio Service (CBRS) between Preferred Access License (PAL) and General Authorized Access (GAA) users and incumbent protection, and spectrum pooling and assignment for broadcasting spectrum in accordance with business arrangements between a broadcaster and content providers.

The software defined interface of the spectrum controller may make function calls via suitable Application Programming Interfaces (APIs), for example, to:

allocate spectrum over different time intervals to different content;

assign power levels for radio transmissions for these assigned spectrum, as well as other transmission and network layer parameters related to such transmission;

provide input to MAC (Medium Access Layer) layer scheduling in the data center to help serve the applications at the right time with the appropriate level of QoS;

provide input to caching functionality at the data centers;

provide an interface to accept input from a Policy function that is used in spectrum control decisions in conjunction with other inputs;

provide the ability to request and accept feedback (such as available capacity, resources, congestion status etc.) from data center functions to use to optimize spectrum allocation, deallocation etc. (spectrum management in general);

use SLA (Service Level Agreement) related metrics and KPIs (Key Performance Indicators) computed by an Analytics engine (such as time taken to serve content requests etc.) to optimize spectrum allocation and deallocation etc. (spectrum management in general);

provide spectrum related analytics to a Network Operations Center (NOC function);

handle requests from the content provider (to then map to spectrum resources) and provide relevant status and feedback to such content providers; and identify anomalous spectrum usage and correlate, where possible, to security and stability of the network.

The exemplary API function calls listed above also may be "chained" together in an automated way, herein referred to as "service chaining." In service chaining, for example, the spectrum controller may call a plurality of functions in a sequence determined by the spectrum controller, e.g., to meet certain technical and/or business needs of the wireless network.

Unlike existing implementations, the disclosed embodiments provide an improved system, in which the spectrum controller may dynamically orchestrate spectrum and/or network resources that are in use or available in one or more data centers. In addition, the spectrum controller, consistent with the embodiments of the present disclosure, may interface with various policy entities, business functions, and management-plane services to provide insight and guidance (e.g., instructions, commands, and/or suggestions) into system or network operations.

In the disclosed embodiments, the one or more data centers, as well as the cloud service entities, may be capable of communicating and interacting with the spectrum controller via SDN or SDN-like software interfaces. In such embodiments, the roles performed by each of the SDN or SDN-like interfaces and the order in which these roles are exercised provide a substantial improvement to a conventional wireless network architecture.

The disclosed embodiments may be implemented in various wireless networks, including but not limited to those serving mobile user devices, Internet of Things (IoT) devices, fixed user devices, and user devices embedded in vehicles. In one disclosed embodiment, for example, the wireless network architecture of the present disclosure may be used in an Advanced Television Systems Committee (ATSC) 3.0 broadcasting network. While a conventional broadcasting network primarily focuses on downlink broadcast of content to user devices, a cloud-based spectrum controller, as described in the disclosed embodiments, may be used to manage various network aspects to control both uplink and downlink data transfer via one or more network data centers. The disclosed embodiments also may be implemented to provide wireless access based on spectrum sharing or spectrum pooling in order to control both uplink and downlink transfer of enterprise data via an enterprise data center.

Figure 1:
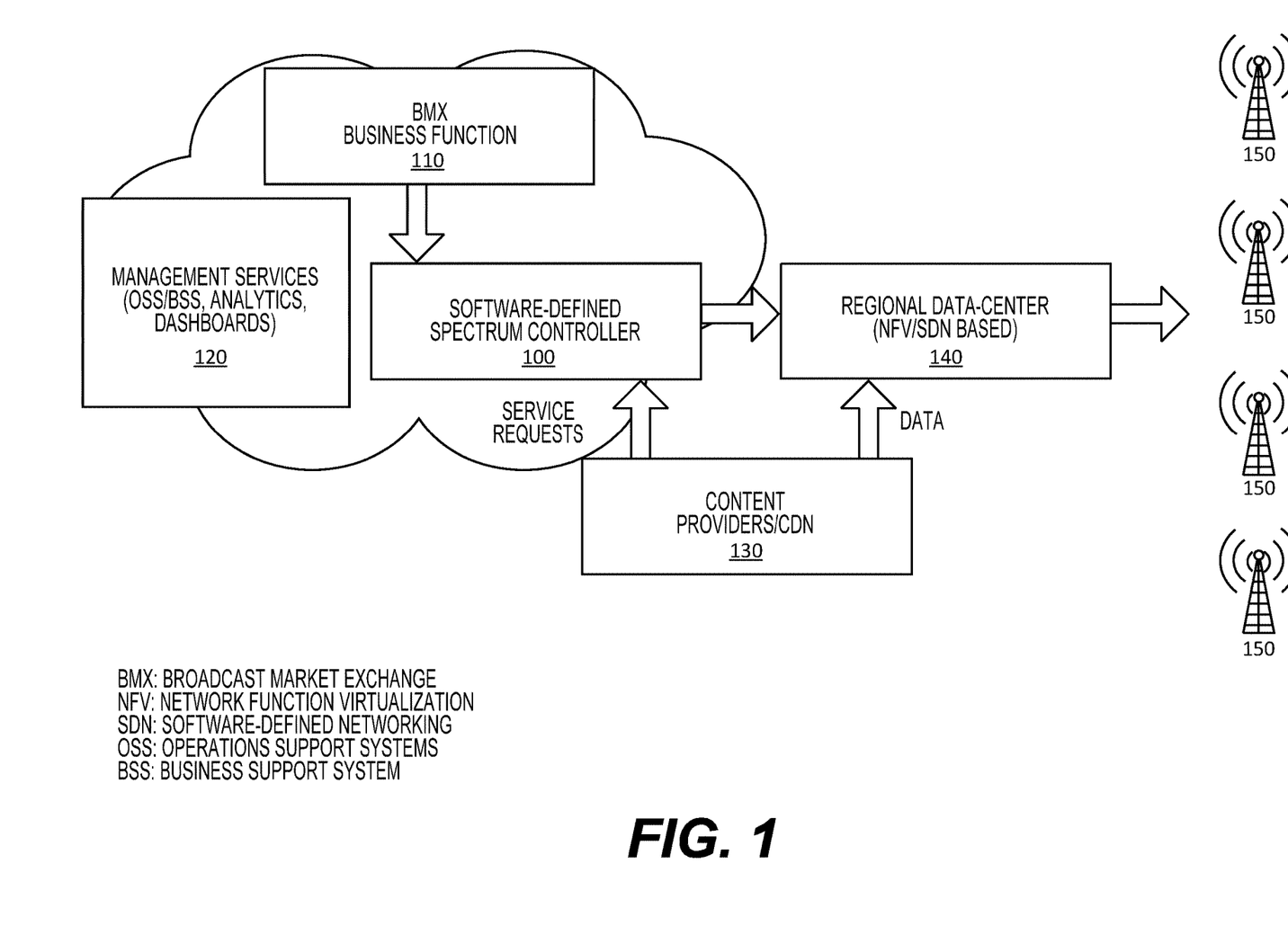
FIG. 1 is a schematic diagram of an exemplary architecture with an exemplary SDSC that may be used in accordance with illustrative embodiments described herein.

FIG. 1 illustrates a schematic diagram of an exemplary wireless network architecture including an exemplary SDSC 100 that may be used in accordance with embodiments described herein. In some embodiments, the SDSC may be implemented by specialized software running on one or more processors of a computer, whether special-purpose or general-purpose. For example, the SDSC may be embodied in software stored in one or more memories in a computer or that are otherwise accessible to the computer, for example, in any computer-readable storage medium accessible over a local bus, external bus, or network connection. In some embodiments, a computer running the SDSC 100 may include at least one network interface over which the computer may communicate with one or more data centers and other network nodes in the wireless network, which may be any cellular, Wi-Fi, or other wireless network. Additionally, or alternatively, the spectrum controller function of SDSC 100 may be distributed across multiple computers in the network, for example, such that one or more of its spectrum controller functions are implemented across multiple network nodes. In such embodiments, data centers and other network nodes may not have knowledge of whether the SDSC is implemented on a single computer or is distributed across multiple computers, and they may interface with the SDSC as if it were a single entity in the wireless network.

The exemplary architecture of FIG. 1 may further comprise cloud-based business functions provided by a Broadcast Market Exchange (BMX) 110, cloud-based management services 120, one or more content providers or content delivery networks (CDN) 130, one or more regional data centers 140, and one or more RF transmitters or other transmission infrastructures 150 used to transmit data from the data centers 140. In some embodiments, BMX 110 may serve as an exchange for spectrum pooling or spectrum sharing by broadcasters. For example, BMX 110 may comprise rules of spectrum pooling that are established by broadcasters.

In some embodiments, SDSC 100 may acquire business functions, including business guidance policies, rules of operations, and business objectives, to be met in terms of one or more optimization criteria provided by BMX 110. In some embodiments, SDSC 100 may acquire requests for delivering different types of content over a broadcast infrastructure from the content providers or CDN 130. For example, SDSC 100 may receive service requests from content providers or a CDN 130 to deliver content via the regional data centers 140 and transmitters 150. Based on these requests, in some embodiments the SDSC 100 may determine how to meet certain business objectives in the network while, at the same time, serving the requests made by content providers to deliver specified content over the broadcast infrastructure. In some aspects, SDSC 100 may take into account the spectrum and/or network resources that are required to adequately meet the storage, processing, and transmission needs of different requests received. In such embodiments, the SDSC 100 may match the required resources with the actual resources that are available, such as spectrum availability and availability of data center and radio resources. In some embodiments, SDSC 100 may interact with a data center 140 over well-defined SDN software interfaces in order to check the actual availability of data center and radio resources. The content providers or CDN 130 may provide the requested data to a regional data center 140 for transmission via transmitters 150.

In the exemplary embodiment of FIG. 1, the open arrows shown pointing into and out of SDSC 100 may be implemented as software interfaces with programmatically defined APIs. For example, SDSC 100 may use a first software interface, such as a cloud-based RESTful interface, to receive the service requests from the content providers 130, and a second software interface, such as a cloud-based OpenFlow interface, to communicate guidance to the regional data centers 140. While the content providers 130 and data centers 140 are separately shown in FIG. 1, those skilled in the art will appreciate that there may be at least some overlap between these network nodes, e.g., at least one network node may provide service requests or other inputs, such as relating to spectrum or network resource usage, to the SDSC, and also may receive guidance from the SDSC regarding which spectrum and network resources may be used for transmitting requested data and/or how to implement rules or policies in the network.

Figure 2:
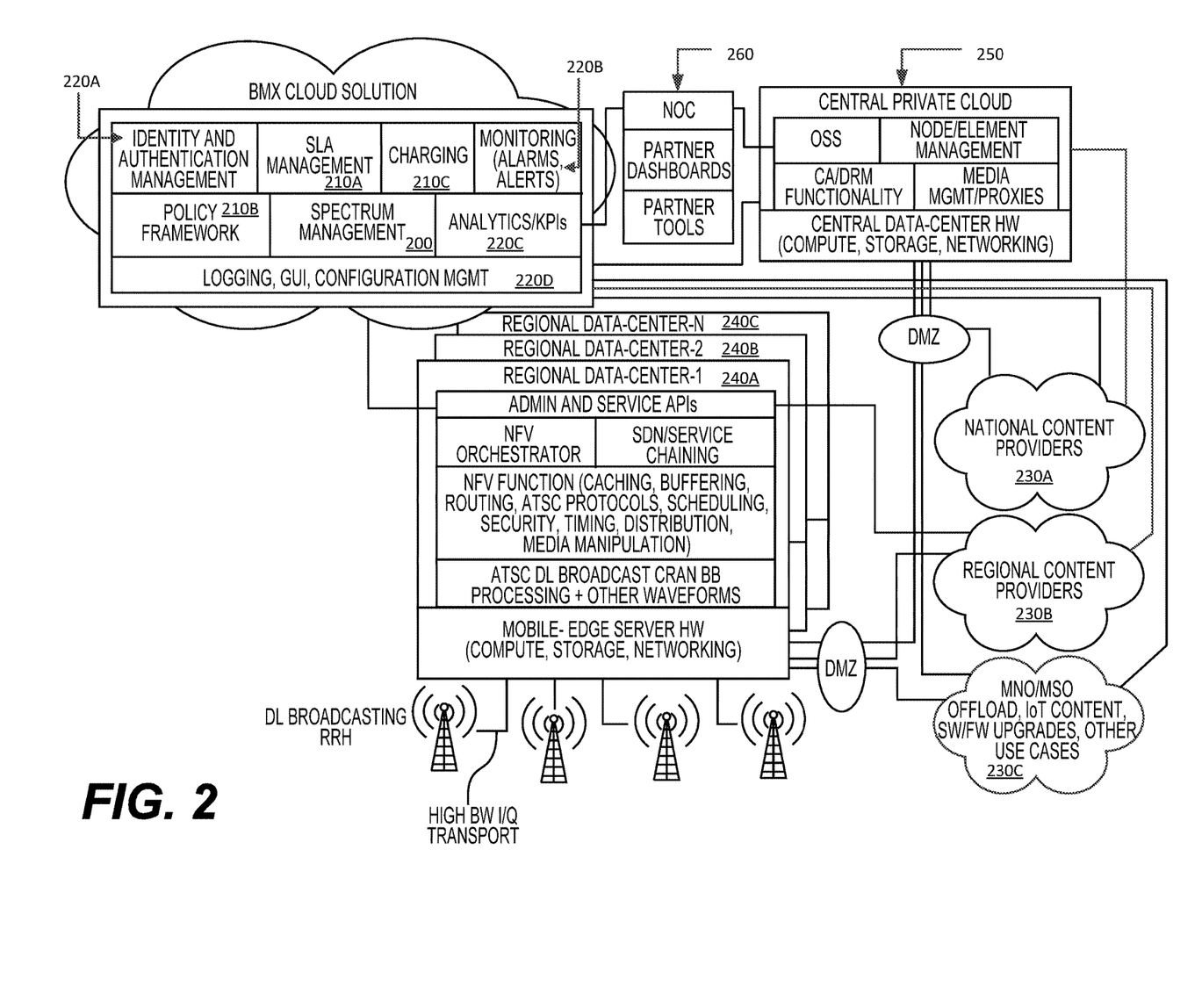
FIG. 2 is a more detailed schematic diagram of the exemplary architecture with an SDSC that may be used in accordance with illustrative embodiments described herein.

FIG. 2 illustrates the exemplary wireless network architecture of FIG. 1 in further detail and illustrates various exemplary network entities and their functions that may be used in accordance with embodiments disclosed herein. In FIG. 2, for example, SDSC 100 is implemented as a cloud-based Spectrum Management entity 200 in a BMX cloud solution. As discussed below, each of the additional exemplary entities 210A-C and 220A-D in the BMX cloud solution of FIG. 2 may be a separate cloud-based service and may provide one or more functions in support of its service.

The exemplary business functions provided by the BMX service 110 in FIG. 1 are identified in FIG. 2 as a Service Level Agreement (SLA) management entity 210A, a Policy Framework entity 210B, and a Charging entity 210C. The BMX service also may provide other or additional cloud-based functions that are not shown in FIG. 2. SLA management entity 210A may manage agreements between various parties in the wireless network. For example, SLA management entity 210A may manage compliance with agreements among content providers, broadcast partners, broadcasting network operators, mobile network operators, etc. The Policy Framework entity 210B may provide support for policies associated with the SLAs. Such policies may allow differentiation between different QoS that should be provided for different contents under different scenarios. Charging entity 210C may provide management of charging related functions and may facilitate various business relationships. For example, the Charging entity 210C may facilitate business relationships or transactions between content providers and broadcasting network operators.

The exemplary management services 120 in FIG. 1 are further identified in FIG. 2 as including, for example, an Identity and Authentication Management (IAM) entity 220A, a Monitoring entity 220B, an Analytics/KPIs entity 220C, and a Logging, GUI, and Configuration Management entity 220D. In this example, IAM 220A may be configured to provide secure user access in the wireless network, e.g., using known authentication procedures. Monitoring functions 220B may track operational metrics to identify, manage, and predict a performance impact to network operations, cloud services, or other aspects of the wireless network. Analytics/KPI functions 220C may track performance, facilitate optimized deployments, identify areas for new deployments, assist in SLA enforcements, and provide inputs to one or more machine-learning based business intelligence solutions.

In some embodiments, the data centers 140 of FIG. 1 may comprise a plurality of regional data centers 240A-C. The BMX cloud solution may further comprise software interfaces to the regional data centers 240A-C in order to manage communications between the cloud services and each of the data centers. By way of further example, the content providers or CDN 130 of FIG. 1 may further be divided into National Content Providers 230A or Regional Content Providers 230B that provide data for transmission in the wireless network, and also may include one or more network nodes 230C that provide other use cases for transmitting data in the wireless network, including but not limited to a Mobile Network Operator (MNO) or Multiple System Operator (MSO), Internet of Things (IoT) devices that transmit content, network nodes that transmit software (SW) and firmware (FW) upgrades, and any other network nodes or entities that provide sources of content to transmit in the wireless network.

The data centers 240A-C also may include one or more functions and services. For example, the exemplary data centers in FIG. 2 may comprise various Admin and Service APIs including, for example, functions for a Network Function Virtualization (NFV) Orchestrator, function to support SDN Service Chaining, various other NFV functions (such as caching, buffering, scheduling, etc.), functions for processing ATSC downlink (DL) broadcast signals, baseband (BB) signals, or other waveforms, and functions for managing Mobile-Edge Server hardware and a Physical Layer. The data centers may be coupled to RF transmitters that provide a remote radio head (RRH) for downlink broadcasting of data, for example, using high bandwidth in-phase/quadrature modulation and transport.

In some embodiments, the exemplary wireless network architecture may further comprise a Central Private Cloud infrastructure 250. As seen in FIG. 2, the exemplary Central Private Cloud infrastructure 250 may provide various functions, including but not limited to functions for Operations Support System (OSS), Conditional Access/Digital Rights Management (CA/DRM), Node Management Server (NMS), Element Management Server (EMS), and Media management and Proxy services. For example, in some embodiments, these various functions may be used to manage any national-level content that should be sent to regional data centers after the content has been processed. In other embodiments, the functions of the Central Private Cloud infrastructure 250 may be functions that span regional data centers by nature and reside in a Central Data Center. In yet other embodiments, the Central Private Cloud may provide enterprise-level functions and services.

In some embodiments, the EMS and NMS services for regional data centers may allow the central data center to manage the regional data centers. Alternatively, although it may be more difficult to manage, each regional data center may be self-managed and share information with other regional data centers as peers. In addition, while EMS may manage individual data centers, NMS may manage both the individual data centers as well as the interconnections between each data center. In addition to the EMS and NMS services, the OSS function may also service fulfillment, assurance, customer care, and billing. For instance, the OSS may manage activation, provisioning, and delivery of services. Moreover, the OSS may handle management across multiple vendors if applicable.

In other embodiments, the Central Private Cloud infrastructure 250 may further comprise software interfaces to the BMX cloud solution. For instance, the central data center may handle most, if not all, interfaces and information exchange to the BMX cloud solution. In another embodiment, the Control Access/DRM function provided by the Central Private Cloud infrastructure 250 may be useful in regulating content or data passing through the central data center. For example, the Control Access/DRM function may manage national data that needs to be routed to the regional data centers. Also, the Central Private Cloud infrastructure 250 may further provide Media management and Proxy services, which may re-format any incoming data or manipulate various protocols.

In one embodiment, the Central Private Cloud infrastructure 250 may further provide other functionalities, including data and signal routing and network management. Data and signal routing functionality may ensure that data and signaling packets coming into a data center are routed to the correct corresponding functions. Network management functionality may ensure robustness against network overload, protection against denial of service attacks, intrusion detection, and various firewall functions.

In another embodiment, the Central Private Cloud infrastructure 250 may further provide system services, including timing and frequency synchronization and distribution, which may ensure that the timing and frequency synchronization systems are working appropriately and may also be responsible for delivering timing and frequency reference to network nodes or functions in the system that need the information. Other functions that may be provided include, for example, logging/KPI/diagnostics generation and management framework, SW/FW upgrade or rollback management, and fault and failure management, among others.

The exemplary wireless network architecture of FIG. 2 may further comprise a Network Operations Center (NOC) 260. NOC 260 may provide Partner Dashboards and other tools that participants of the BMX 110 can use to observe the utilization and/or allocation of their spectrum resources. Additionally, the BMX cloud solution may comprise interfaces to NOC 260 in order to provide support for such network operations visibility.

Those skilled in the art will appreciate the wireless network architecture in FIG. 2 is merely exemplary for purposes of explanation and the disclosed embodiments may be implemented with additional or other functions and services in the wireless network consistent with the claims described herein. Those skilled in the art will also appreciate that many variations of the exemplary architecture are possible. For example, the exemplary buffers (demilitarized zones, DMZ) between the content providers and data centers and between the content providers and the Central Private Cloud, and other disclosed features may not be necessary depending on a particular implementation consistent with the disclosed embodiments.

Figure 3:
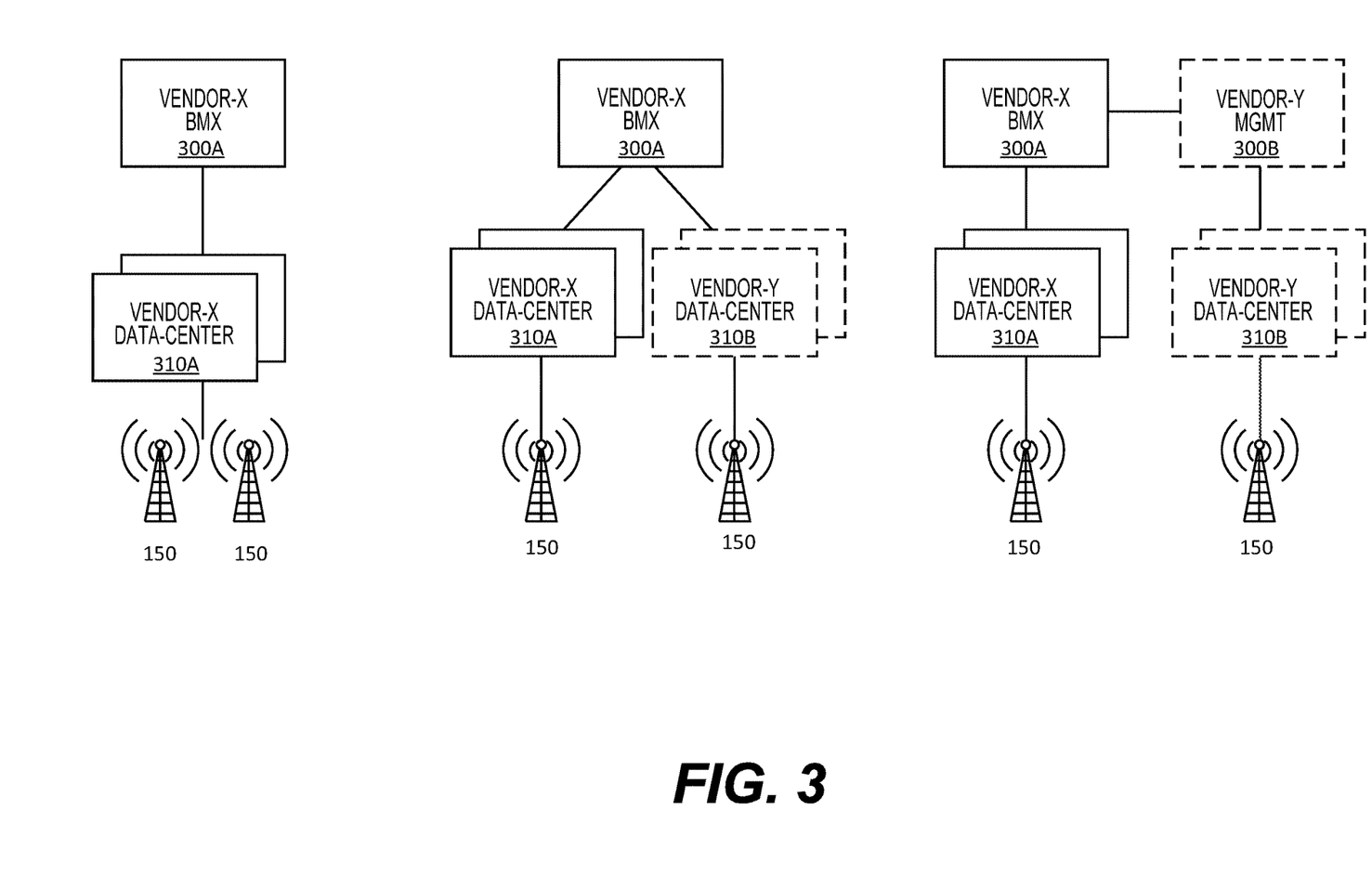
FIG. 3 is a schematic diagram of exemplary single-vendor and multi-vendor architectures that may be used in accordance with illustrative embodiments described herein.

FIG. 3 discloses exemplary single-vendor (left side) and multi-vendor (middle and right side) architectures for a broadcasting network that may be used in accordance with the disclosed embodiments. With standardized interfaces among BMX 110, management service entities 120, content providers 130, and data centers 140 via SDSC 100, inter-vendor operability is possible. As such, different vendors may be able to operate in one wireless network architecture. In the single-vendor exemplary embodiment, shown on the left side of FIG. 3, a broadcast channel owner 310A with a plurality of transmission infrastructures 150 may connect their transmission infrastructures 150 to a cloud-based BMX 300A for its services provided by a Vendor X. The cloud-based BMX 300A may include the SDSC 100.

In the exemplary multi-vendor embodiment shown in the middle of FIG. 3, multiple external broadcast channel owners 310A and 310B with their own transmission infrastructures 150 may connect their transmission infrastructures 150 to a common cloud-based BMX 300A for to access services provided by Vendor X. In this exemplary embodiment, the broadcast channel owner 310B may be configured to use services from Vendor Y in its own network, but also may want to expand to use some additional services provided by Vendor X. In this embodiment, Vendor-Y data center 310B may access at least some Vendor-X services in BMX 300A using one or more software interfaces.

In the exemplary multi-vendor embodiment on the right side of FIG. 3, external broadcast channel owners 310A and 310B with their own transmission infrastructures 150 may connect their transmission infrastructures 150 to their own cloud-based BMX 300A and 300B platforms for their own services, respectively provided by Vendors X and Y. In this exemplary embodiment, the data center of broadcast channel owner 310B may access a management service 300B provided by Vendor Y, which in turn may be configured to communicate and interact with the Vendor-X BMX 300A over appropriate software interfaces. In this example, the broadcast channel owner 310B may access its Vendor-Y services in its data center 310B but also may access at least some services of Vendor X via the Vendor-Y management service 300B. In this way, an external broadcast channel owner having its own complete network from Vendor Y may connect its management plane and management services to Vendor X's cloud-based BMX platform 300A to access at least some services and functions of Vendor X.

Figure 4:
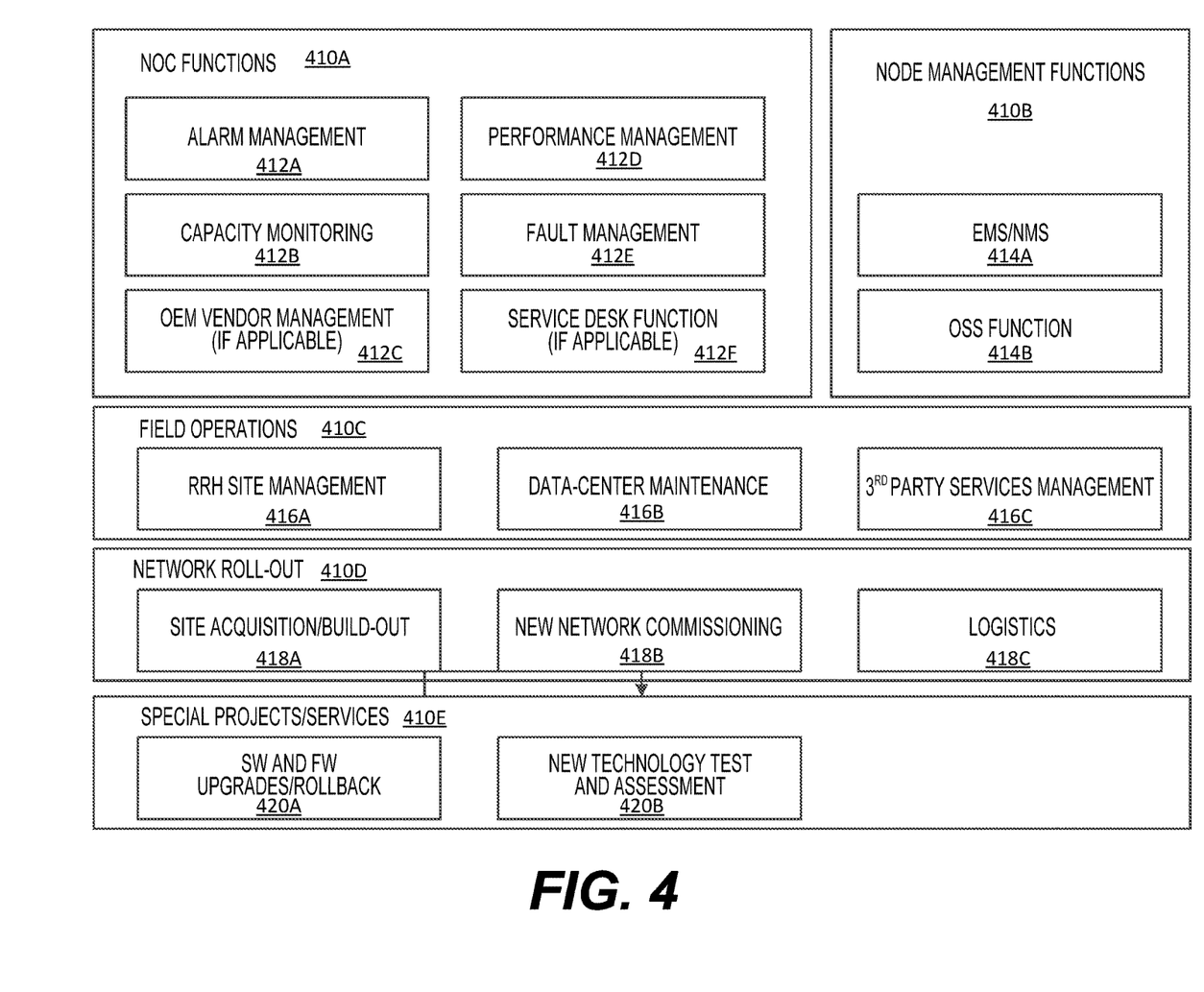
FIG. 4 is an exemplary block diagram showing various network operations functions that may be used in accordance with illustrative embodiments described herein.

FIG. 4 illustrates various exemplary functions that may be provided by a NOC 410A and other exemplary network operations functions 410B-E that may be used in accordance with the disclosed embodiments. In some embodiments, the NOC functions 410A may provide information on the functioning and status of SDSC 100 (FIG. 1) and 200 (FIG. 2). As seen in FIG. 4, some NOC functions 410A include alarm management 412A, capacity monitoring 412B, original equipment manufacturer (OEM) vendor management (if applicable) 412C, performance management 412D, fault management 412E, and service desk functions 412F. In addition, some node management functions 410B may further comprise EMS/NMS functions 414A and OSS functions 414B. In this exemplary embodiment, field operations functions 410C may further provide remote radio head (RRH) site management 416A, data center maintenance 416B, and management of third party services 416C. Moreover, network roll-out functions 410D may further comprise functions for site acquisition/build-out 418A, new network commissioning 418B, and logistics management 418C. The exemplary special project services 410E may further provide functions for SW and FW upgrades/rollback 420A and new technology test and assessment 420B. The exemplary functions shown in FIG. 4 are not exhaustive of the functions that may be implemented in the NOC or other network nodes providing network management services. Those skilled in the art will appreciate that additional or alternative functions or fewer functions may be used in accordance with any of the disclosed embodiments.

Figure 5:
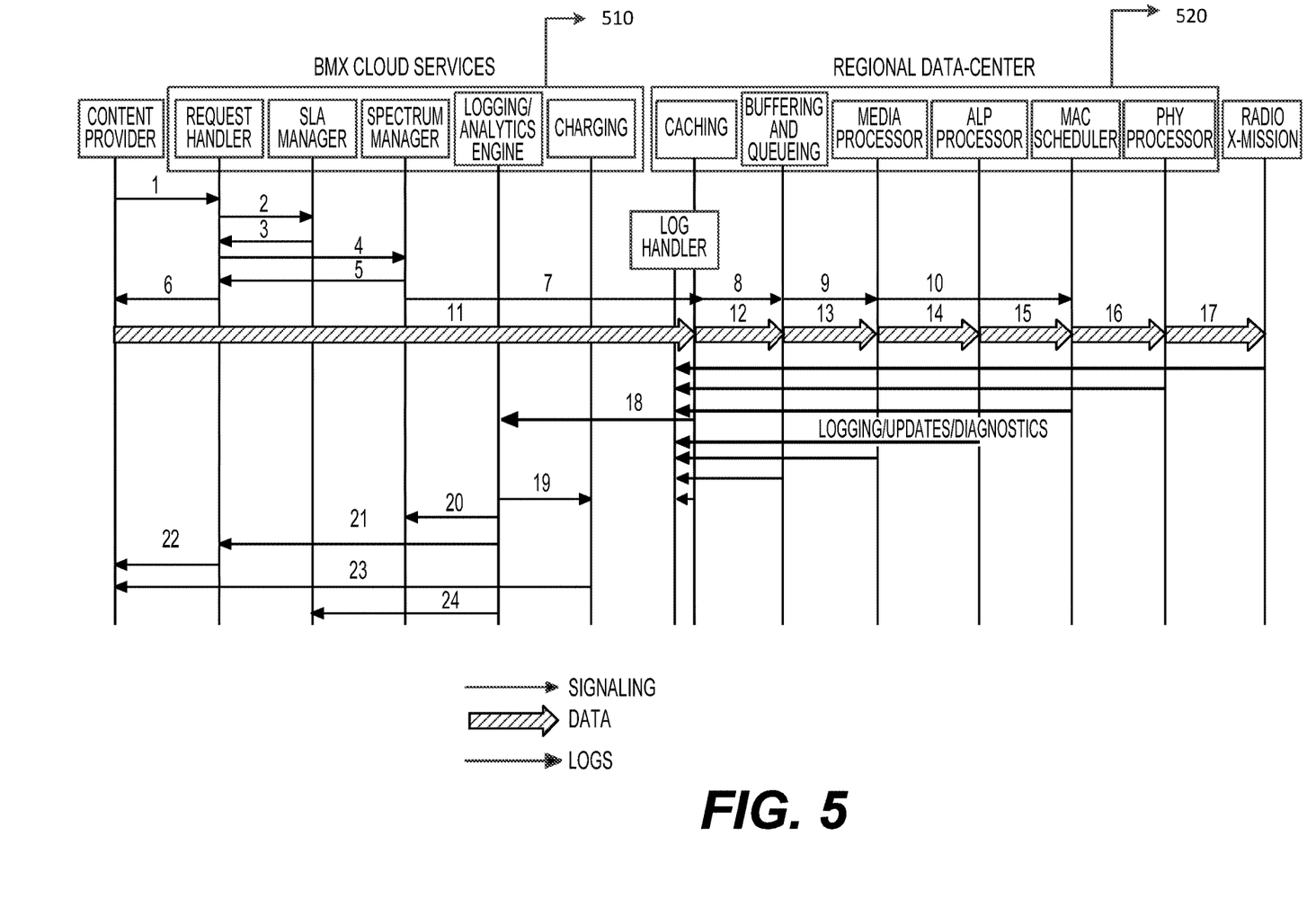
FIG. 5 is a diagram of exemplary steps associated with a content provider data call-flow that may be used in accordance with certain illustrative embodiments herein.

FIG. 5 illustrates exemplary steps that may be performed in a content provider data call-flow in accordance with certain disclosed embodiments. For example, FIG. 5 shows an exemplary division of tasks between cloud-based services 510, such as the BMX cloud solution in FIG. 2, and a regional data center 520, such as any of the regional data centers 240A-C.

In some embodiments, the exemplary data-call flow may start at step 1 when the BMX cloud services 510 receives a service request from a content provider. After receiving the service request at a request handler, at steps 2 and 3, the BMX cloud services 510 may check the SLA with the content provider and confirm the SLA status. Once SLA status of the content provider is confirmed, at step 4, the service request may be passed to the SDSC (e.g., a Spectrum Management service 200 in BMX cloud services 510) to allocate resources needed to provide the requested service. If the SDSC is able to allocate the necessary resources, at steps 5 and 6, the SDSC may confirm the service can be provided and convey the confirmation to the content provider via the request handler.

The SDSC may schedule content and notify the appropriate regional data center functions of the service confirmation, at steps 7-10. For example, the SDSC may notify service details to various regional data center functions, including the Caching function (step 7), Buffering and Queuing function (step 8), Media processor (step 9), and Medium Access Control (MAC) scheduler (step 10). After the service details have been transmitted to the regional data center functions, content data may be ready to be transferred to the regional broadcasting data center from the content provider at steps 11-17. In some disclosed embodiments (not shown in FIG. 5), one or more network security functions, such as Firewall and Intrusion Detection functions, may be implemented prior to transferring the content data to the regional broadcasting data center.

In certain embodiments, the content data may be passed to the Caching function such that the content data may be cached in accordance with the details of the service request. If caching is not necessary, the content may not be cached by the Caching function. Further, content data may be passed to the Buffering and Queuing Function, the Media processing functions, the ATSC Link Protocol (ALP) processing function, and MAC scheduler function in accordance with the details of the service request. Then, content data may further be passed to the Physical layer (PHY) processor in accordance with details provided by the MAC scheduler guidance, and passed to RRH transmission system. Each content data passed to the functions in the regional data center may be logged in the Log Handler.

In some embodiments, at step 18, logs from all regional data center functions may be processed and sent to the Logging and Analytics engine in the BMX cloud services 510. The Analytics engine of the BMX cloud services 510 may pass charging related information to the Charging function, at step 19, and may send a regional data center capacity estimate to the SDSC at step 20. At step 21, the Analytics engine may further inform the request handler with details of the service requested, for example, indicating a status of the service requested. In response, at step 22, the request handler may send the status information of the service requested and other details to the content provider. In some embodiments, the Charging function may pass the received charging information to the content provider at step 23. At step 24, the Analytics engine may provide KPIs related to the service request to the SLA manager function for SLA assessment and enforcement. If SLA assessment and enforcement fails, an alert or alarm may be generated in the call flow to indicate the failure.

Figure 6:
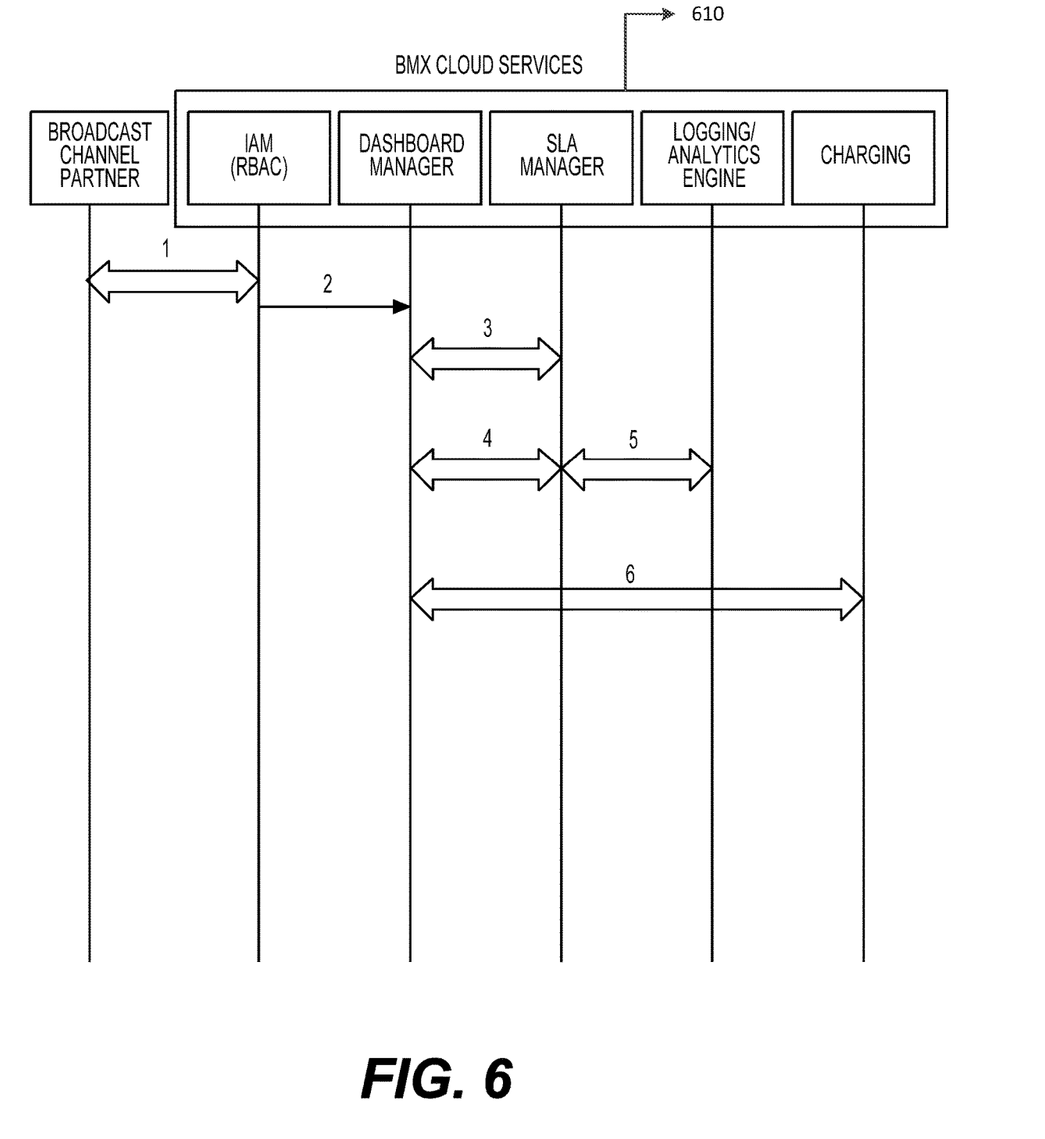
FIG. 6 is a diagram of exemplary steps associated with providing a viewing dashboard for a broadcast channel partner that may be used in accordance with certain illustrative embodiments herein.

FIG. 6 illustrates exemplary steps that may be performed to provide a user interface, such as a dashboard, to a broadcast channel partner in accordance with certain disclosed embodiments. The broadcast channel partner, or another authorized entity, may use the dashboard to access information about spectrum and/or network resource usage in the wireless network. For example, at step 1, the broadcast channel partner may access the viewing dashboard by logging into a web-based portal and entering its credentials. After authentication of the credentials has been completed by an IAM entity in the BMX cloud services 610, the channel partner's system may be given privileges based on the channel partner's role. The channel partner's role may be ascertained using a Role Based Access Control (RBAC), for example, provided by one or more functions in an IAM service. At step 2, access control information may be passed to a Dashboard manager function, and the broadcast channel partner may use a web-portal dashboard and underlying Dashboard manager to review provisions of an applicable SLA via a SLA manager, at step 3. The broadcast channel partner also may access and review the KPIs associated with his SLA in the web-portal dashboard at step 3. In order for the broadcast channel partner to review the KPIs in the dashboard, the underlying Dashboard manager may need to interact with the SLA manager and the Analytics engine, at steps 4 and 5. Similarly, the underlying Dashboard manager may interact with the Charging function such that the broadcast channel partner may review charging related information in the web-portal dashboard at step 6.

Figure 7:
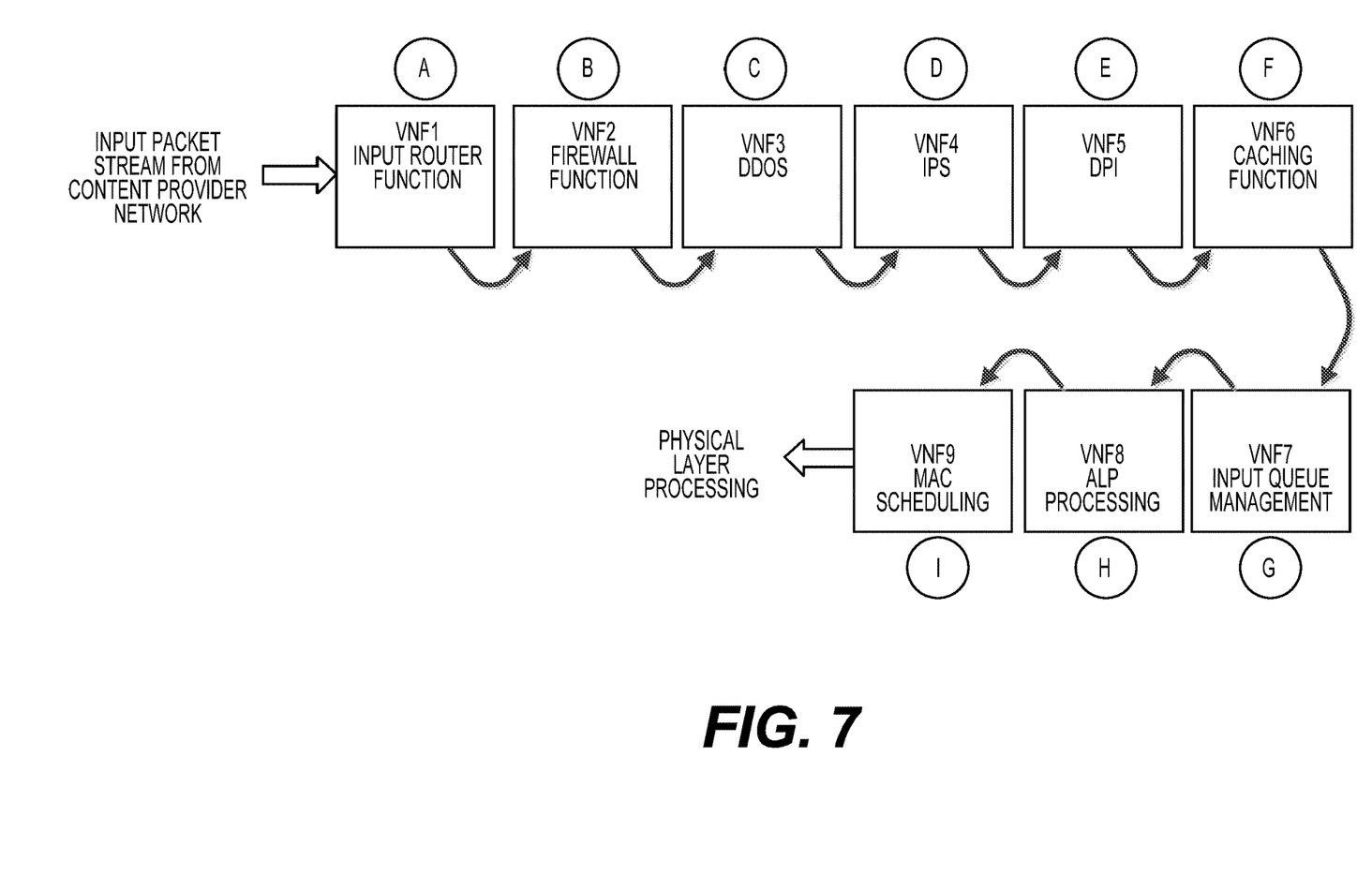
FIG. 7 is a schematic diagram of an exemplary service provider functions that may be called on by an exemplary SDSC to provide programmatic "service chaining" in accordance with certain illustrative embodiments described herein.

Further to at least some of the disclosed embodiments, a plurality of functions may be called in a sequence to create a "chain" of services, called "service chaining," such that an operational goal may be met. For example, as shown in FIG. 7, the cloud-based SDSC may call an automated sequence of functions (shown by the sequence of arrows between exemplary functions A-I) via software interfaces of the data center functions. As seen in the example of FIG. 7, the SDSC may automatically call various functions, for example the exemplary functions VNF1-9 at steps A-I in FIG. 7, to coordinate and facilitate the processing of a data-packet stream from a content provider network to a PHY processor, e.g., located in a data center. In some embodiments, the cloud-based SDSC may call an ordered sequence of functions corresponding to the "service chain" after the SDSC has determined the appropriate spectrum to be allocated for transmission of a particular content at a specified time. For instance, the SDSC may determine which automated sequence of functions to call based on the particular content that should be transmitted.

Accordingly, in some embodiments, the SDSC may comprise intelligence for chaining function calls to a plurality of functions associated with services in the wireless network. The intelligence may be provided, for example, by one or more SDN Service Chaining functions in the spectrum controller 100 (FIG. 1) or 200 (FIG. 2) and may interact with corresponding SDN Service Chaining functions, for example, implemented in the data centers 240A-C (FIG. 2). Alternatively, or additionally, the intelligence may be implemented as a separate service, for example, in the BMX cloud solution. The service-chaining intelligence in the SDSC may be configured to determine at least one of which service-function calls to chain together, under which circumstances to chain the service-function calls, in which order to chain the service-function calls, and with which settings to chain the service-function calls. In some embodiments, the service-chaining intelligence may determine the sequence of function calls (e.g., the exemplary service chain from A-I in FIG. 7) based on an output from the optimization algorithm.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein. In accordance with additional embodiments of the present disclosure, a computer-readable medium is disclosed that stores instructions that, when executed by a processor(s), causes the processor(s) to perform operations consistent with one or more disclosed methods.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A software-defined spectrum controller (SDSC) in a wireless network, the wireless network comprising a first network node configured to implement a function for a service in the network and a second network node configured to enforce one or more policies or rules established by a service provider in the network, the SDSC comprising:
    a first software interface configured to receive an input from the function in the first network node, the input being based on a spectrum resource and a network resource in the wireless network;
    an optimization algorithm configured to use the received input to determine which policies or rules to enforce at the second network node, the optimization algorithm being configured to generate guidance for the second network node to dynamically change one or more of the rules or policies that are enforced by the second network node; and
    a second software interface configured to communicate the guidance to the second network node in the wireless network.

2. The SDSC of claim 1, wherein the first network node is the same as the second network node.

3. The SDSC of claim 1, wherein the function in the first network node is one of an access network function, a signaling and packet core-network function, a network management function, a policy function, a billing function, a service level agreement management function, or a content delivery network function.

4. The SDSC of claim 1, wherein the optimization algorithm is configured to meet at least one of a business criterion or a QoS criterion established by the service provider.

5. The SDSC of claim 1, wherein the optimization algorithm is configured to satisfy at least one of a technology constraint, a timing constraint, or a service-level agreement constraint.

6. The SDSC of claim 1, wherein the SDSC is implemented as a cloud-based service in the wireless network.

7. The SDSC of claim 6, wherein the SDSC is implemented as a cloud service in a Broadcast Market Exchange (BMX) cloud solution.

8. The SDSC of claim 1, wherein at least one of the first or second software interface is a standardized cloud-based interface.

9. The SDSC of claim 6, wherein the first software interface is a RESTful interface.

10. The SDSC of claim 6, wherein the second software interface is an OpenFlow interface.

11. The SDSC of claim 1, wherein the SDSC further comprises a third software interface configured to communicate with a function residing in a network operations center of the service provider.

12. The SDSC of claim 11, wherein the network operations center comprises at least one function configured to provide information corresponding to one or more decisions made by the SDSC regarding usage of spectrum or network resources.

13. The SDSC of claim 1, wherein the SDSC further comprises a third software interface configured to communicate with a function residing in a central data center of the service provider.

14. The SDSC of claim 1, wherein the SDSC further comprises intelligence for chaining function calls to a plurality of functions associated with services in the wireless network.

15. The SDSC of claim 14, wherein the intelligence is configured to determine at least one of which service-function calls to chain together, under which circumstances to chain the service-function calls, in which order to chain the service-function calls, or with which settings to chain the service-function calls.

16. The SDSC of claim 14, wherein the intelligence performs service chaining based on an output from the optimization algorithm.

17. The SDSC of claim 1, wherein the SDSC further comprises an analytics engine configured to provide at least one input to the optimization algorithm.

18. A method for managing resources in a wireless network, the wireless network comprising a first network node configured to implement a function for a service in the network and a second network node configured to enforce one or more policies or rules established by a service provider in the network, the SDSC comprising:
receiving, using a first software interface, an input from the function in the first network node, the input being based on a spectrum resource and a network resource in the wireless network;
using the received input in an optimization algorithm to determine which policies or rules to enforce at the second network node, the optimization algorithm being configured to generate guidance for the second network node to dynamically change one or more of the rules or policies that are enforced by the second network node; and
communicating, using a second software interface, the guidance to the second network node in the wireless network.

19. The method of claim 18, wherein the first network node is the same as the second network node.

20. The method of claim 18, wherein the function in the first network node is one of an access network function, a signaling and packet core-network function, a network management function, a policy function, a billing function, a service level agreement management function, or a content delivery network function.

21. The method of claim 18, wherein the optimization algorithm is configured to meet at least one of a business criterion or a QoS criterion established by the service provider.

22. The method of claim 18, wherein the optimization algorithm is configured to satisfy at least one of a technology constraint, a timing constraint, or a service-level agreement constraint.

23. The method of claim 18, wherein the method is implemented by a cloud-based service in the wireless network.

24. The method of claim 23, wherein the method is implemented as part of a cloud service in a Broadcast Market Exchange (BMX) cloud solution.

25. The method of claim 23, wherein at least one of the first or second software interface is a standardized cloud-based interface.

26. The method of claim 23, wherein the first software interface is a RESTful interface.

27. The method of claim 23, wherein the second software interface is an OpenFlow interface.

28. The method of claim 18, wherein the method is performed by a software-defined spectrum controller (SDSC) in the wireless network.

29. The method of claim 18, further comprising: communicating, using a third software interface, with a function residing in a network operations center of the service provider.

30. The method of claim 18, further comprising: communicating, using a third software interface, with a function residing in a central data center of the service provider.

31. The method of claim 18, further comprising: chaining function calls to a plurality of functions associated with services in the wireless network.

32. The method of claim 31, further comprising: determining at least one of which service-function calls to chain together, under which circumstances to chain the service-function calls, in which order to chain the service-function calls, or with which settings to chain the service-function calls.

33. The method of claim 31, wherein the step of chaining function calls further comprises service chaining based on an output from the optimization algorithm.

34. The method of claim 18, further comprising: providing at least one input to the optimization algorithm from an analytics engine.

* * * * *